(12) United States Patent
Stuart et al.

(10) Patent No.: US 9,176,990 B2
(45) Date of Patent: Nov. 3, 2015

(54) VISUAL IMAGE ANNOTATION, TAGGING OF INFRARED IMAGES, AND INFRARED IMAGE LINKING

(75) Inventors: Michael Devin Stuart, Issaquah, WA (US); Tyrone Foster, Vancouver, WA (US)

(73) Assignee: Fluke Corporation, Everette, WA (US)

( * ) Notice: Subject to any disclaimer, the term of this patent is extended or adjusted under 35 U.S.C. 154(b) by 772 days.

(21) Appl. No.: 13/040,667

(22) Filed: Mar. 4, 2011

(65) Prior Publication Data

US 2012/0224067 A1 Sep. 6, 2012

(51) Int. Cl.
*H04N 5/33* (2006.01)
*G06F 17/30* (2006.01)

(52) U.S. Cl.
CPC ............................... *G06F 17/30265* (2013.01)

(58) Field of Classification Search
CPC .................. G08B 13/19641; G08B 13/19643; H04N 5/332; G06F 17/30265
USPC .................................... 348/164; 715/231, 233
See application file for complete search history.

(56) References Cited

U.S. PATENT DOCUMENTS

| | | | | |
|---|---|---|---|---|
| 5,386,117 A | * | 1/1995 | Piety et al. | 250/330 |
| 5,637,871 A | * | 6/1997 | Piety et al. | 250/330 |
| 7,234,106 B2 | * | 6/2007 | Simske | 715/230 |
| 2002/0143775 A1 | * | 10/2002 | Wilkinson et al. | 707/10 |
| 2008/0069480 A1 | * | 3/2008 | Aarabi et al. | 382/305 |
| 2010/0086283 A1 | * | 4/2010 | Ramachandran et al. | 386/95 |

OTHER PUBLICATIONS

European Search Report and Opinion for European Application No. 12158094.8, dated Jul. 18, 2012, 5 pages.

* cited by examiner

*Primary Examiner* — William C Vaughn, Jr.
*Assistant Examiner* — Naod Belai
(74) *Attorney, Agent, or Firm* — Fredrikson & Byron, P.A.

(57) ABSTRACT

Methods used with a thermal imager in capturing a primary thermal image of an object or scene and then associating it, as desired, with any of a multitude of information relating to the object or scene. The related information can be associated with the primary thermal image in the field after the image is captured. The related information can pertain to further detail regarding the object, the surroundings of the scene, and/or surroundings of the location of the scene, which when associated with the primary thermal image, collectively represents a form of asset information card for the image.

26 Claims, 6 Drawing Sheets

VISUAL IMAGE ANNOTATION, TAGGING OF INFRARED IMAGES, AND INFRARED IMAGE LINKING

BACKGROUND

The present invention relates to the field of infrared cameras. More particularly, this invention relates to infrared cameras enabling an operator to capture a thermal image of an object or scene and then associate it with any of a myriad of information relating to the object or scene.

BACKGROUND

Thermal imaging cameras have long been used in many settings to measure temperature profiles and analyze thermal variations and differences of one or more objects in a scene. To that end, such profiles can be used in comparing the different temperatures of the objects at any given time, or conversely, can be used in comparing these temperatures or thermal variations and differences over a period of time. For example, infrared cameras are frequently used in industrial applications as part of preventative maintenance programs and for building sciences and diagnostics inspections These types of programs often typically rely on periodic inspections of the assets of a plant, facility, or structure to discover likely failures before they occur or monitor and document ongoing performance For example, in an industrial setting, plant personnel often develop survey routes in order to routinely gather temperature data on the identified equipment. As is known, similar examples exist in other applications for building sciences as well.

In an industrial setting example, after collecting a thermal baseline image for each piece of equipment along a route, a person (such as a thermographer, an inspector, a building performance professional, an electrician, a technician, etc.) can then identify changes in thermal characteristics over the course of several inspections by comparing later thermal images of the equipment with the baseline image or other prior images. Changes in thermal characteristics can in some cases indicate the imminent failure of a part, thus allowing the person to schedule maintenance or replacement prior to failure.

In a simple case, a person can visually compare thermal images captured at different times to determine changes in thermal characteristics over the time period. However, only so much information can be gleaned solely from thermal images. To aid in the analysis, whether with respect to a most recent image captured (or in comparing such image to images previously captured), infrared imaging cameras have been configured to allow operators to add notes or annotations to an image. These annotations are generally created as audio or text files, and can be subsequently saved to the image in order to provide supplementary information which is difficult to ascertain from the image alone.

However, issues have been encountered to date in adding these annotations to the image. In particular, some cameras only enable for annotations to be added at the time the thermal image is saved (with limited ability for later modification), while other cameras enable annotations to be added after the image is saved. As such, it is not uncommon to find operators of these cameras further carrying a notebook to jot down their impressions of the scene in the field. In turn, the operator waits until later to combine these impressions into a single file which can then be stored with the saved image of the scene. Unfortunately, this process is time-consuming and invites error, because what is observed and noted in the field may not be fully recalled, even with the use of such notebook. Further, the operator may not be able to remember the particular image that the annotations correspond to, inviting further potential error. However, at present, adding annotations in this fashion is one of the few ways to create some record as to what is observed in the field as it relates to a captured image.

A further difficulty faced by people in analyzing thermal images is their visual clarity, as the images are often less sharp and more complex as compared to visible-light images, for example. To aid with visual comparison of such images, some infrared imaging cameras have been designed to allow the operator to capture a visible-light image of the scene using a separate visible-light camera built into the infrared imaging camera. In some cases, such cameras allow a user to view the visible-light image side-by-side with the infrared image. In other cases, such cameras enable infrared and visible-light images to be provided in overlapping or blended relationship to each other. Such features enable the operator to have a visible-light image reference for an infrared image, thus making inspection of the infrared image somewhat easier.

However, one difficulty in using visible-light images (or even further infrared images) for complementary detail is that the images are often captured and stored separately from the initially-captured infrared image. As such, grouping such images together is left to be done with separate software once the operator has returned from the field. This again contributes delay to the process. However, even more unfortunate is that the method of grouping such images is rather antiquated, with the images typically grouped by electronic folder. This method of grouping is far from dynamic, and as such, often limits the ease and breadth of subsequent analysis.

Embodiments of the invention are provided to address the above-described limitations.

SUMMARY

Embodiments of the present invention are useful with a thermal imager in capturing a primary thermal image of an object or scene and then associating it, as desired, with any of a myriad of information relating to the object or scene. The related information can be associated with the primary thermal image in the field after the image is captured. The related information can pertain to further detail regarding the object, the surroundings of the scene, and/or the surroundings of the location of the scene, which when associated with the primary thermal image, collectively represents a form of asset information card for the image. The related information is generally in the form of images and video recordings, whether infrared and/or visible-light, and can be associated to the primary thermal image in varying or distinct manners, such as being based on relatedness of the information to the object or the scene.

BRIEF DESCRIPTION OF THE DRAWINGS

The following drawings are illustrative of particular embodiments of the present invention and therefore do not limit the scope of the invention. The drawings are not to scale (unless so stated) and are intended for use in conjunction with the explanations in the following detailed description. Embodiments of the present invention will hereinafter be described in conjunction with the appended drawings, wherein like numerals denote like elements.

DETAILED DESCRIPTION OF ILLUSTRATIVE EMBODIMENTS

Figure 1:
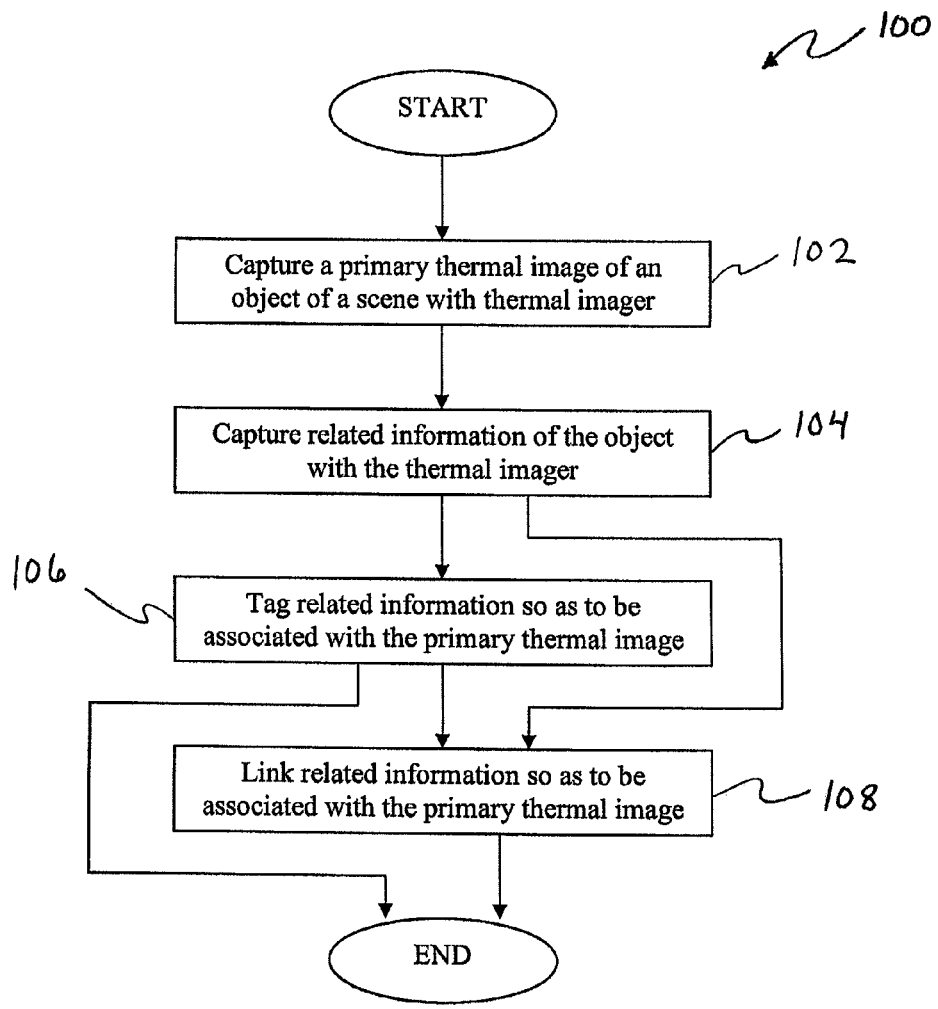
FIG. 1 is a flow diagram illustrating a method of capturing a primary thermal image of an object of a scene and then associating related information to the image in accordance with certain embodiments of the invention.

The following detailed description is exemplary in nature and is not intended to limit the scope, applicability, or configuration of the invention in any way. Rather, the following description provides practical illustrations for implementing exemplary embodiments of the present invention. Examples of constructions, materials, dimensions, and manufacturing processes are provided for selected elements, and all other elements employ that which is known to those of skill in the field of the invention. Those skilled in the art will recognize that many of the examples provided have suitable alternatives that can be utilized.

As summarized above, embodiments of the present invention are useful with a thermal imager in capturing a primary thermal image of an object or scene and then associating it, as desired, with a multitude of information relating to the object or scene. Such information relating to the object or scene ("related information") can pertain to further details regarding the object, the surroundings of the scene, and/or surroundings of the location of the scene. To that end, the related information is generally captured in the form of images or video recordings, and then associated with the primary thermal image. In essence, when associated with the primary thermal image, the related information collectively represents a form of asset information card for the image that can be created on the same visit to the field during which the image is captured. Such approach enables the related information to be readily accessed and updated by an operator (such as a thermographer, an inspector, a building performance professional, an electrician, a technician, etc.) upon retrieval of the primary thermal image from the imager.

As described above, the related information may involve a multitude of detailed information, generally represented as a significant quantity of images and/or video recordings. Thus, in certain embodiments, the related information is associated to the primary thermal image in varying manners to enable greater understanding for the operator of what the information represents. For example, as described above, the related information can involve details regarding the object. To that end, such details may involve items shown in the primary thermal image, yet not in clear view or of adequate focus. For example, if the object of the primary thermal image is a motor, additional detail regarding the motor (as shown in the image) may be obtained from zoomed-in views. Such views, for instance, could focus on corresponding labels mounted on the outer surface of the motor, listing corresponding specifications or applicable warnings for the motor. Therefore, it may be desirable to have such information legibly captured, and in turn, directly associated with the primary thermal image. To that end, the thermal imager can be equipped to capture visible-light (VL) images and/or video. Further, in certain embodiments, the imager can be configured to allow this related information (once captured) to be "tagged" with the primary thermal image.

Alternately or in addition, the related information can involve details that can only be ascertained through different views of the object, views of the surroundings of the scene, or views of the surroundings of the location of the scene. Accordingly, such details generally relate to items not shown or focused on in the primary thermal image, thereby providing a point of distinction from the captured and tagged images described above. For example, in an industrial or maintenance setting, such details may involve other outer surfaces of the object, mounting brackets or secondary pieces of equipment mounted close to or extending from the object, or features of the space or room in which the object is kept. These details may be significant to the functioning of the object or found as contributing factors to the thermal characteristics observed in the primary thermal image.

Another example, such as in a building sciences and diagnostics setting, might involve capturing details of nearby structures, construction design, and objects that may impact the thermal signature in view, such as locations of other building structures; devices; and objects including HVAC diffusers, windows, doors, electrical chase penetrations (such as outlets, switches, lighting fixtures), plumbing penetrations, furniture, appliances, etc.; as well as pertinent text information and labels that may exist on some of these items. As such, the views of such details are often captured in the form of thermal images, visible images, and/or video using the thermal imager. As alluded to above, due to their indirect relation to the primary thermal image (i.e., not being shown or focused on in the primary thermal image), it may be useful to have such information associated with the image in a distinct manner. Accordingly, in certain embodiments, the thermal imager is configured to allow this related information (once captured) to be "linked" to the primary thermal image.

As described above, in order to distinguish the breadth of related information noted in the field, some of the related information may be tagged and other of the information may be linked. In certain embodiments, such tagged related information pertains to details shown in the primary thermal image, while linked related information pertains to details not shown in the primary thermal image. However, it should be appreciated that the related information can be differentiated via tagging and linking using other distinguishing profiles without departing from the spirit of the invention. To that end, it should be understood the distinguishing profiles described herein by which the related information is either tagged or linked is but one applicable example.

Also, one aspect of the above-described "tagged" and "linked" related information is that the thermal imager is equipped to perform such tagging and linking functions in the field once the primary thermal image is captured. Therefore, the post-processing time normally involved in associating such related information with the primary thermal image (which has been known to take place upon a return from the field) can be greatly minimized. Additionally, during the same and subsequent trips to the scene, this tagged and linked information can be readily retrieved with the primary thermal image. Consequently, the tagged and linked information can be examined in comparison to images of one or more of the object, scene, and location subsequently captured during return visits to the field. Such functionality of a thermal imager can be useful in many situations and applications.

For example, embodiments of the invention can be implemented in the field of preventative maintenance, to determine and localize changes in the thermal characteristics of equipment over time. Another example, as described above, can lie in the area of building sciences and diagnostics inspection. Further, embodiments of the invention can be useful in process-intensive environments, e.g., in petrochemical or pharmaceutical production. In such environments, monitoring and documenting both the thermal and visible changes in the processed material or equipment is often critical to the final output desired.

Turning to FIG. 1, a flow diagram is shown illustrating a method in accordance with certain embodiments of the invention. The method 100 involves capturing a primary thermal image of an object or a scene and then associating related information to the primary thermal image. For example, as shown, an initial step 102 of the method 100 involves capturing a primary thermal image of an object of a scene with a thermal imager. In certain embodiments, the thermal imager is an infrared (IR) camera with the captured primary thermal image being an IR image. The object, in certain embodiments, can involve a plurality of objects proximate to each other from which thermal characteristics may be ascertained.

A subsequent step 104 of the method 100 involves capturing information relating to the object with the thermal imager. In certain embodiments, such related information can take the form of one or more images and/or one or more video recordings, potentially representing a plethora of information relating to the object. If the related information pertains to details regarding the object, e.g., labels of the object (as exemplified above), it may be desirable to capture such details via VL functionality of the thermal imager. Alternately or in addition, capturing further detailed information regarding the object, in certain embodiments, can involve taking thermal, e.g., IR, images and video recordings. As such, in certain embodiments, the thermal imager has both IR and VL imaging capabilities. An example of such an imager or camera is illustrated in FIGS. 2A and 2B.

Figure 2A:
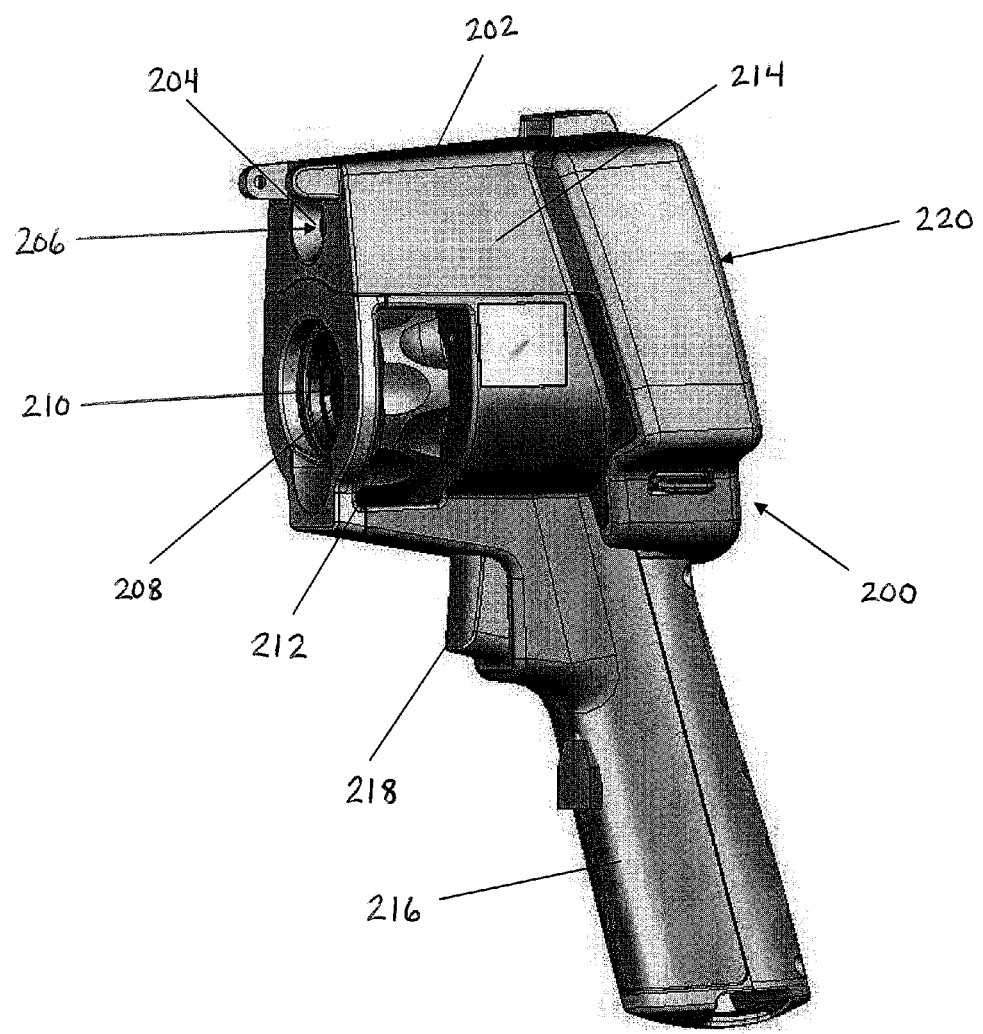
FIGS. 2A and 2B are perspective views of an infrared imaging camera in accordance with certain embodiments of the invention.
Figure 2B:
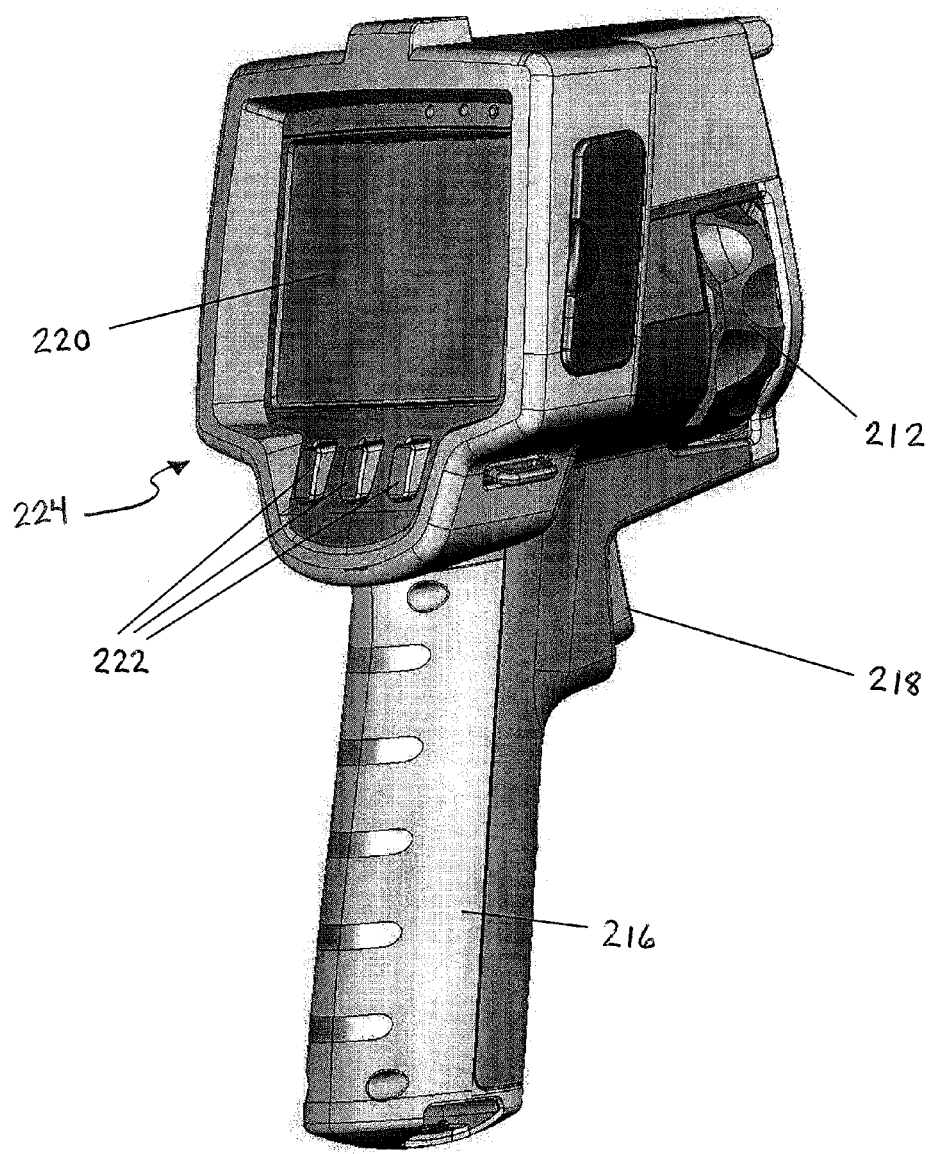

FIGS. 2A and 2B are perspective views, respectively, of the front and the back of an IR imaging camera 200 according to certain embodiments of the invention. The camera 200 includes an IR camera module and a VL camera module, and a housing 202 for supporting both IR and VL modules. The housing 202 can be formed from one or more injection molded, hard plastic parts, and provides an ergonomic user interface 224 for various members of camera 200, as will be described below. The VL module includes a VL lens 204 for receiving a cone of VL energy from a target scene generally centered as along input axis 206. Likewise, the IR module includes an IR lens 208 for receiving a cone of IR energy from a target scene generally centered as along input axis 210. In certain embodiments, as shown, the IR lens 208 is positioned below VL lens 204.

As with most cameras, the camera 200 allows for zooming functionality with respect to each of the VL lens 204 and IR lens 208. Conversely, in certain embodiments, the assembly involving the VL lens 204 is such that the VL camera module remains in focus at all usable distances. Only the IR lens 208 needs focus adjustment for targets at different distances. To that end, as shown, the IR camera module includes an assembly for focusing the IR lens 208. In certain embodiments, as shown, such assembly includes a rotatable outer ring 212 having depressions therein to accommodate one or more finger tips for adjustment thereof.

With reference to FIG. 2A, in some cases the VL lens 204 and the IR lens 208 may be offset from one another, thus providing a known, fixed spatial correlation between VL and IR image data and images captured by the camera 200. For example, in some cases, the VL lens 204 and the IR lens 208 may be placed such that their respective visible and infrared optical axes 206 and 210, respectively, are as close as practical and roughly parallel to each other. In certain embodiments, as shown in FIG. 2A, the VL lens 204 and the IR lens 206 can be co-located such that their optical axes 206 and 210, respectively, are in a vertical plane. Of course other spatial arrangements are possible, such as, for example, co-location within a horizontal plane.

The camera housing 202 contains various electronics as will be described below. In certain embodiments, the housing 202 has an upper portion 214 which holds electronics for the VL and IR camera modules. The upper portion 214 can also include a LED torch/flash, located on each side of the VL lens 204, to aid in providing enough light in dark environments, as well a laser pointer. The housing 202 includes a lower portion which extends into a handle portion 216 for helping grasp the camera 200 during use. As shown, the handle portion 216 includes a trigger 218 mounted to the housing 202 below the outer ring 212 for image capture. The handle portion 216 can also include a power source, for example, a rechargeable battery.

As more clearly shown in FIG. 2B, a display 220 is located on the back of the camera 200 so that IR images, VL images, and/or blended compilations of both images may be displayed to the user. In addition, radiometric target site temperature (including temperature measurement spot size) and distance readings may be displayed. Also located on the back of the camera 200 are user controls which, among other functionality, can be used to control the display mode and activate or deactivate certain functions of the camera 200, as will be further described below. To that end, in certain embodiments, such controls 222 can comprise one or more of buttons, switches, dials, etc. for controlling such camera functionality.

Referring back to the method 100 of FIG. 1, in certain embodiments, one or more of steps 102 and 104 can further include the step of adding annotations to the captured primary IR image and related information, respectively. Such annotations generally involve complementary information noted by the operator with reference to the captured primary thermal image or the related information. Examples of such annotations can include text insertions, audio recordings, or markings. To that end, such annotations provide a further rounding out of details as they may relate to the captured primary thermal image and/or related information. For example, it is often useful to provide text with an image to detail important aspects thereof. In addition, an audio recording can be useful to provide a significant amount of insight regarding the captured primary thermal image or related information. Finally, it may be useful to mark certain segments of the primary thermal image or related information (e.g., with regard to an arrow, circle, square, star, or numbers) for noting/designating purposes. Thus, in certain embodiments, when the primary infrared image or the related information is subsequently retrieved from the thermal imager, each is retrieved with its corresponding annotations. The process of adding such annotations will be described later.

The related information, as described above, may involve details regarding the object. In certain embodiments, it is desirable to have such information (once captured) directly associated with the primary thermal image. Consequently, following capture of such related information in step 104 of the method 100, a subsequent step 106 can involve tagging the related information with respect to the primary thermal image (as alluded to above). To that end, in certain embodiments, when retrieving a primary thermal image from memory of the thermal imager, if the image is tagged, e.g., to other saved images, the imager is configured to provide one or more of visible or audio queues to the operator regarding such. In turn, the operator can retrieve the tagged images as desired from the memory, e.g., via a pop-up menu shown on the display 214 listing the images correspondingly tagged to the primary thermal image. The process of tagging will be described later.

Alternatively or in addition, the related information can pertain to details ascertained via different views of the object, views of the surroundings of the object scene, or views of the surroundings of the location of the scene. As described above, these details may be significant to the functioning of the object or found as contributing factors to the thermal characteristics observed in the primary thermal image. Consequently, in certain embodiments, these details are captured via one or more thermal images for their use when analyzing the object. However, due to their indirect relation to the primary thermal image (i.e., not being shown in the primary thermal image), it may be useful to have such information associated with the image in a different manner. Accordingly, following capture of such related information in step 104 of the method 100, a further step 108 can involve linking the related information to the primary thermal image. To that end, in certain embodiments, when retrieving a primary thermal image from memory of the thermal imager, if the image is linked, e.g., to other saved images, the imager is configured to provide one or more of visible or audio queues to the operator regarding such. In turn, the operator can retrieve the linked images as desired from the memory, e.g., via a pop-up menu shown on the display 214 listing the images correspondingly linked to the primary thermal image. The process of linking will be described later.

With reference to the method 100, it should be appreciated that only one of the tagging and linking steps 106, 108 may be applicable, depending on the object of the primary thermal image. For example, the primary thermal image may not show any corresponding details needing to be captured. However, there may be potentially informative details that can be ascertained from different views of the object, views of the scene surrounding the object, and/or views of the location surrounding the scene, each of which may aid with analysis of the primary thermal image. Accordingly, there may only be a need for the linking step 108, whereupon the method 100 moves from step 104 to step 108. Conversely, there may only be a need for the tagging step 106. Consequently, the linking step 108 would be skipped in the method 100. Finally, if there is a need for both tagging and linking steps (where there are important details shown in the primary thermal image as well as seemingly important details that may be ascertained via different views of the object, views of the surroundings of the object scene, or views of the surroundings of the location of the scene), the method 100, as shown, can proceed from step 104 to step 106, and then on to step 108. Alternatively, while not shown, the method 100 could just as well proceed from step 104 to step 108, and then to step 106.

As described above, some of the related information captured in step 104 may be linked to the primary thermal image, as performed in step 108. Such related information, as further described, can involve thermal images of any of different views of the object, views of the scene surrounding the object, and views of the location surrounding the scene. Given the multitude of these views, there may be a desire to distinguish such related information. To that end, in certain embodiments, step 108 further involves the related information being categorically linked to the primary thermal image based on the relatedness of such information to the object.

For example, in certain embodiments, thermal images captured of differing views of the object (with them being closely related to the object) are primarily linked to the primary infrared image. Additionally, in certain embodiments, thermal images captured of views of the scene surrounding the object or views of the location surrounding the scene (with them being less closely related to the object) are secondarily linked to the primary infrared image. To that end, in certain embodiments, when retrieving a primary thermal image from memory of the thermal imager, if the image is linked, e.g., to other saved images, the imager is configured to provide one or more of visible or audio queues to the operator regarding such. In turn, the operator can retrieve the linked images from the memory as desired, e.g., via a pop-up menu shown on the display 214 listing the images correspondingly linked to the primary thermal image, in terms of quantity and category. The process of assigning the links categorically will be described later.

As described above, the camera housing 202 of FIGS. 2A and 2B contains various electronics. Some of the electronics involves the camera engine, generally held within the upper portion 214 of the camera 200. The engine includes both the IR and VL camera modules. In certain embodiments, the VL module includes a visible light sensor formed of an array of detectors, such as CMOS, CCD or other types of visible-light detectors. In certain embodiments, the array is 1280×1024 pixels (i.e., a 1.3 mega pixel camera). As such, the VL module captures a VL image of a scene and generates and streams corresponding RGB image display data (e.g. 30 Hz) to an FPGA (as further referenced below) for combination with infrared RGB image data from the IR camera module and then sends the combined image data to the display 220. In certain embodiments, the VL module further includes video recording capability for video-rate capture.

Figure 3:
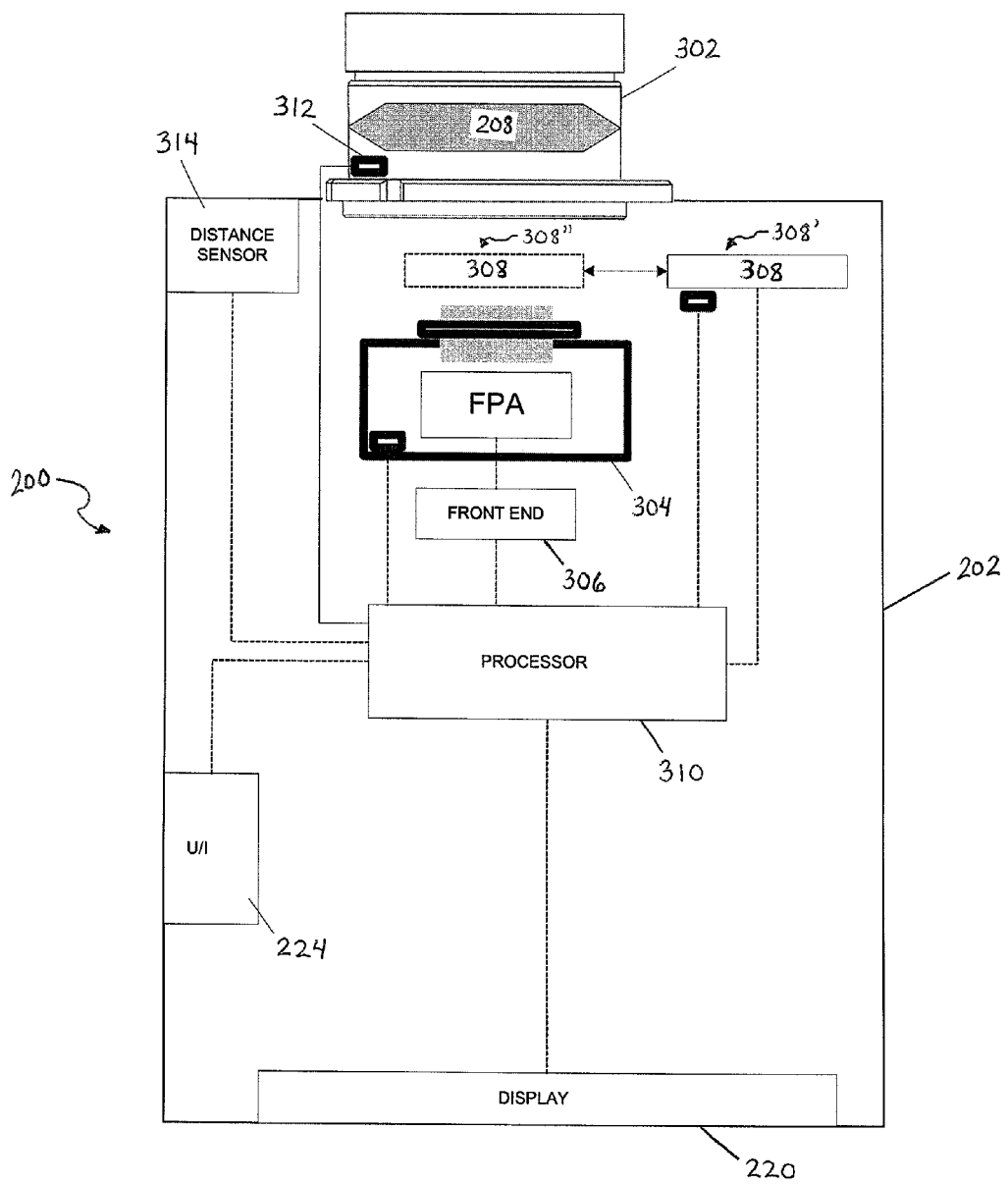
FIG. 3 is a schematic block diagram of internal electronics of the camera of FIGS. 2A and 2B in relation to an IR camera module in accordance with certain embodiments of the invention.

FIG. 3 is a schematic block diagram of internal electronics of the camera 200 of FIGS. 2A and 2B in relation to an IR camera module in accordance with certain embodiments of the invention. These electronics include an IR lens assembly 302 and an infrared sensor 304, such as a focal plane array (FPA) of microbolometers. The IR lens assembly 302 (which includes the camera IR lens 208) and FPA 304 are components of an electronic system that controls IR operation and communicates (as exemplified by the dotted lines) with other components of the camera 200. In operation, the camera 200 receives image information in the form of IR energy through the lens 208, which is then directed onto the FPA 304. The combined functioning of the lens 208 and FPA 304 enables further electronics within the camera 200 to create an image based on the image view captured by the lens 208, as described below.

The FPA 304 can include a plurality of IR detector elements (not shown), e.g., including bolometers, photon detectors, or other suitable IR detectors well known in the art, arranged in a grid pattern (e.g., an array of detector elements arranged in horizontal rows and vertical columns). The size of the array can be provided as desired and appropriate. In some embodiments involving bolometers as the IR detector elements, each detector element is adapted to absorb heat energy from the scene of interest (focused upon by the lens 208) in the form of IR radiation, resulting in a corresponding change in its temperature, which results in a corresponding change in its resistance. With each detector element functioning as a pixel, a two-dimensional image or picture representation of the infrared radiation can be further generated by translating the changes in resistance of each detector element into a time-multiplexed electrical signal that can be processed for visualization on a display or storage in memory (e.g., of a computer). Further front end circuitry 306 downstream from the FPA 304 is used to perform this translation.

As described above, the FPA 304 generates a series of electrical signals corresponding to the infrared radiation received by each infrared detector element to represent a thermal image. A "frame" of thermal image data is generated when the voltage signal from each infrared detector element is obtained by scanning all of the rows that make up the FPA 304. Again, in certain embodiments involving bolometers as the infrared detector elements, such scanning is done by switching a corresponding detector element into the system circuit and applying a bias voltage across such switched-in element. Successive frames of thermal image data are generated by repeatedly scanning the rows of the FPA 304, with such frames being produced at a rate sufficient to generate a video representation (e.g. 30 Hz, or 60 Hz) of the thermal image data.

In certain embodiments, as shown, the camera 200 can further include a shutter 308 mounted within the camera housing 202 that is located relative to the lens 208 and operates to open or close the view provided by the lens 208. In the shutter open position 308', the shutter 308 permits IR radiation collected by the lens to pass to the FPA 304. In the closed position 308'', the shutter 308 blocks IR radiation collected by the lens 208 from passing to the FPA 304. As is known in the art, the shutter 308 can be mechanically positionable, or can be actuated by an electro-mechanical device, such as a DC motor or solenoid.

The camera may include other circuitry (front end circuitry 306) for interfacing with and controlling the optical components. In addition, the front end circuitry 306 initially processes and transmits collected IR image data to a processor 310. More specifically, the signals generated by the FPA 304 are initially conditioned by the front end circuitry 306 of the camera 200. To that end, the front end circuitry 306 can include a bias generator and a pre-amp/integrator. In addition to providing the detector bias, the bias generator can optionally add or subtract an average bias current from the total current generated for each switched-in detector element. In turn, the signals can be passed through a pre-amp/integrator. Typically, the pre-amp/integrator is used to condition incoming signals, e.g., prior to their digitization. As a result, the incoming signals can be adjusted to a form that enables more effective interpretation of the signals, and in turn, can lead to more effective resolution of the created image. Subsequently, the conditioned signals are sent downstream into the processor 310.

In some embodiments, the front end circuitry can include one or more additional elements for example, additional sensors or an ADC. Additional sensors can include, for example, temperature sensors 312, visual light sensors (such as a CCD), pressure sensors, magnetic sensors, etc. Such sensors can provide additional calibration and detection information to enhance the functionality of the camera 200. For example, temperature sensors can provide an ambient temperature reading near the FPA 304 to assist in radiometry calculations. A magnetic sensor, such as a Hall effect sensor, can be used in combination with a magnet mounted on the lens to provide lens focus position information. Such information can be useful for calculating distances, or determining a parallax offset for use with visual light scene data gathered from a visual light sensor. In addition, in certain embodiments, the camera 200 may include a distance sensor 314 that can be used to electronically measure the distance to target. Several different types of distances sensors may be used, such as laser diodes, infrared emitters and detectors, ultrasonic emitters and detectors, etc. and need not be discussed in detail. The output of the distance sensor 314 may be fed to the processor 310.

Generally, the processor 310 (which could also be thought of as a data storage device) can include one or more of a field-programmable gate array (FPGA), a complex programmable logic device (CPLD) controller, and a computer processing unit (CPU) or digital signal processor (DSP). These elements manipulate the conditioned scene image data delivered from the front end circuitry 306, as further detailed below, in order to provide output scene data that can be displayed or stored. In certain embodiments, the FPGA operates under control of the DSP, and memory within the processor 310 may be programmed with instructions for controlling the DSP and the FPGA. Subsequently, the processor 310 sends the processed data to the display 220, internal storage, or other output devices.

For example, in certain embodiments, in addition to or in the alternate of sending the processed data to the display 220, the processor 310 may transfer VL and/or IR image data to an external computing system, such as a personal computer coupled to the camera 200 with a data transfer cord, wireless protocol, memory card, and the like. For example, in use, the external computing system may include a general purpose microprocessor having memory programmed with software instructions for comparing and/or displaying the VL and IR image data as VL and IR images on the personal computer's display.

In addition to providing needed processing for infrared imagery, the processor 310 can be employed for a wide variety of additional functions. For example, in some embodiments, the processor 310 can perform temperature calculation/conversion (radiometry), fuse scene information with data and/or imagery from other sensors, or compress and translate the image data. Additionally, in some embodiments, the processor 310 can interpret and execute commands from the user interface 224. This can involve processing of various input signals and transferring those signals where other camera components can be actuated to accomplish the desired control function. Exemplary control functions can include adjusting the focus, opening/closing the shutter, triggering sensor readings, adjusting bias values, etc. Moreover, input signals may be used to alter the processing of the image data that occurs at the processor 310. It should be noted that while the user interface 224 is depicted on a separate side of the camera housing 202 as is the display 220 in FIG. 3, such is done to avoid obstructed view of these items for the reader, whereas in FIGS. 2A and 2B, the interface 224 and display 220 are illustrated as being positioned adjacent to each other.

Given the above-described electronics of the camera 200 with reference to FIG. 3, steps 102 and 104 of the method 100 of FIG. 1 can be suitably performed. For example, the primary thermal image of the object is captured via the IR lens 208, the FPA 304, conditioned via use of the front end circuitry, and then processed via the processor 310 (e.g., with use of DSP 340 and FPGA 342), upon which the image is simultaneously sent to the display 220 for viewing and stored in the camera memory. Likewise, information relating to the object (i.e., the related information), if involving IR images or video recordings, can be similarly captured, and then displayed and saved. Alternately, if the related information involves VL images or video recordings, such views can be captured via the VL lens 204 and then processed via use of the processor 310 (e.g., with use of DSP 340 and FPGA 342), upon which the image/video is sent to the display 214 and stored.

As described above, following capture of the primary thermal image and the related information in respective steps of 102 and 104 of the method 100, one or more of the image and related information can be provided with annotations. As further described, such annotations generally involve complementary information created by the operator with reference to the captured primary infrared image or the related information, and examples include text insertions, audio recordings, or markings. In certain embodiments, the display 220 and the user interface 224 can be used prominently with regard to annotating (e.g., with underlying commands and processing functions being provided via a controller of the processor 310). For example, in certain embodiments, the operator can select an annotation mode from a menu shown on the display 220. Such menu can be provided automatically upon either the primary infrared image or related information being captured and displayed, or can be the result of a corresponding button of the user interface 224 being depressed. In turn, the operator can annotate the image or related information as desired from a further drop-down menu of options shown on the display 220.

For instance, when selecting text insertion, the operator can input text via the user interface 224, after which such input text can be superimposed as desired on the primary thermal image or related information as provided on the display 220. Alternatively or in addition, when selecting audio recording, the operator can trigger an audio input of the camera 200 via the user interface 224 for recording audio message, with the corresponding message being subsequently saved with the primary thermal image or related information as provided on the display 220. Alternatively or further in addition, when selecting marking, the operator can superimpose one or more markings as desired (e.g., using an interactive pen for the display 220) with respect to the primary thermal image or the related information on the display 220. After performing one or more of such processes, subsequent retrieval of the primary thermal image and the related information from the camera memory involves retrieval of the same as annotated.

Tagging one or more of the related information with the primary thermal image, as provided in step 106 of the method 100, can be performed in similar fashion. For example, upon capturing the related information, the operator has the option of tagging such information to the primary thermal image. In certain embodiments, the tagging process can be initiated via use of the display 220 and/or the user interface 224. For example, in certain embodiments, following capture and subsequent presentation of a select one of the related information on the display 220, the operator can select a tagging mode from a menu shown on the display 220 (e.g., with corresponding commands and processing functions being performed via a controller of the processor 310). Such menu can be provided automatically upon either the related information being captured and displayed, or can be the result of a corresponding button of the user interface 224 being depressed. In turn, the operator can associate the one of the related information to be a tag of the primary thermal image (again, via underlying support from the controller of the processor 310), with the image being saved as such in the camera memory.

Likewise, linking one or more of the related information with the primary thermal image, as provided in step 108 of the method 100, can be performed in similar fashion. For example, upon capturing the related information, the operator has the option of linking such information to the primary thermal image. In certain embodiments, the linking process can be initiated via use of the display 220 and/or the user interface 224. For example, in certain embodiments, following capture and subsequent presentation of a select one of the related information on the display 220, the operator can select a linking mode from a menu shown on the display 220 (e.g., with corresponding commands and processing functions being performed via a controller of the processor 310). Such menu can be provided automatically upon either the related information being captured and displayed, or can be the result of a corresponding button of the user interface 224 being depressed. In turn, the operator can associate the one of the related information to be linked to the primary thermal image (again, via underlying support from the controller of the processor 310), with the image being saved as such in the camera memory.

As described above, the related information linked in method 108 can involve thermal images of any of different views of the object, views of the scene surrounding the object, and views of the location surrounding the scene. In light of the breadth of this information, step 108 of the method can further involve this related information to be categorically linked to the primary thermal image based on the relatedness of such information to the object. As such, in certain embodiments, the process is an extension of the linking process described above (e.g., with corresponding commands and processing functions being performed via the controller of the processor 310). For example, upon selecting a linking mode from a menu shown on the display 220 with respect to one of the related information, the operator can further be presented a drop-down menu of linking designations on the display 220. Such drop-down menu includes two or more different linking options, e.g., primary linking or secondary linking.

In such example, the operator can associate the one of the related information to be either primarily or secondarily linked to the primary thermal image (e.g., via underlying support from the controller of the processor 310), with the image being saved as such in the camera memory. As described above, in certain embodiments, the distinction between different linkages can be based on the relatedness of such information to the object. For example, in the instant example, thermal images captured of differing views of the object (with them being closely related to the object) can be primarily linked to the primary infrared image. Conversely, thermal images captured of views of the scene surrounding the object or views of the location surrounding the scene (with them being less closely related to the object) can be secondarily linked to the primary infrared image. In certain embodiments, the processor 310 is used to differentiate these links, with the linked thermal images being saved as such in the camera memory.

Figure 4:
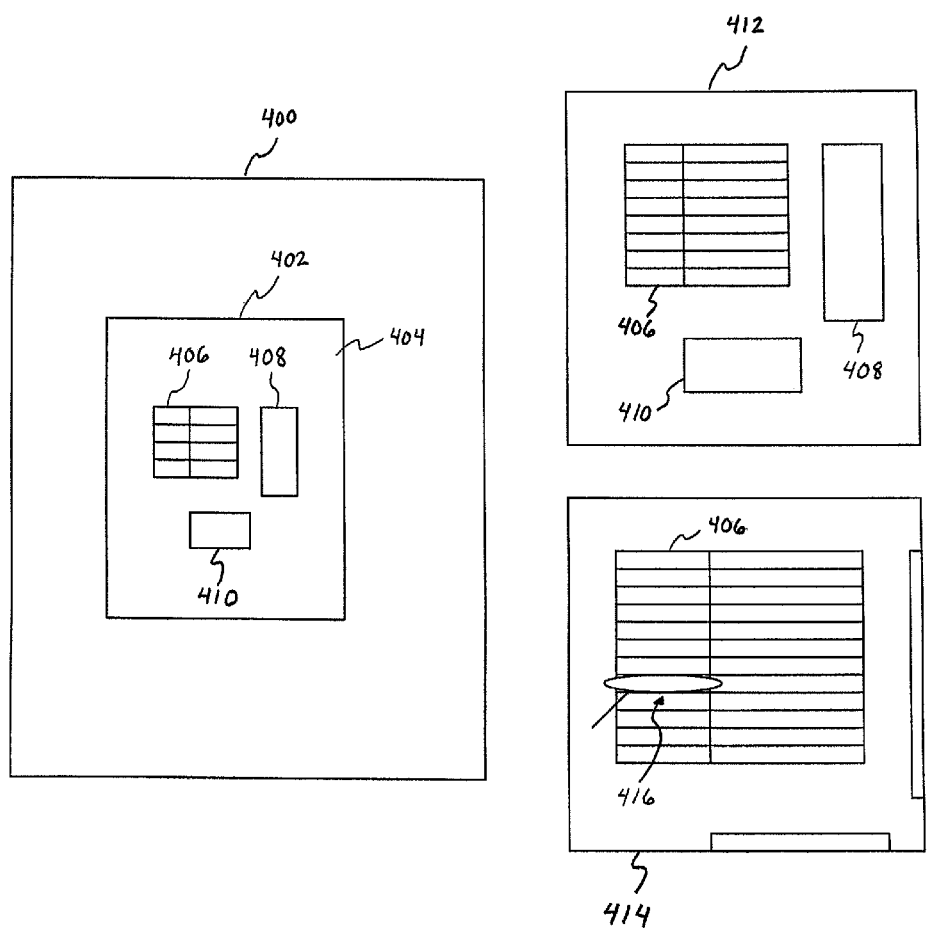
FIG. 4 illustrates a representative captured image set including a primary thermal image and related information tagged thereto in accordance with certain embodiments of the invention.

Turning to FIG. 4, a representative captured image set is shown, including a primary thermal image and related information tagged thereto in accordance with certain embodiments of the invention. The object of attention of the primary thermal image 400 is exemplarily provided as a motor 402. As shown in the image 400, an outer surface 402 of the motor 402 includes various labels, which represent related information of the motor 402. The labels include a specifications label 406, an electrical schematic label 408, and a warnings label 410, one or more of which may represent details of the motor 402 deemed significant enough to capture and tag with respect to the primary thermal image 400. To that end, views of the labels 406, 408, and 410 collectively provided and the individual specification label 406 are exemplarily shown as having been captured and tagged.

As described above, when dealing with related information involving labels, optimum clarity is often desirable. Therefore, visible-light images 412 and 414 of the labels 406, 408, and 410 and of the individual specifications label 406, respectively, are shown as having been captured. As further illustrated, in capturing these images, the corresponding label(s) had been zoomed in on to be made more legible. As described above, with reference to camera 200 of FIGS. 2 and 3, following capture of the images 412 and 414, each are subsequently presented on the camera display 220. In turn, in certain embodiments, the operator can select a tagging mode, e.g., from a menu further shown on the display 220. In such case, through use of the menu, the operator can associate the images 412 and 414 to the primary thermal image 400 via tagging, with the image 400 and tagged images 412 and 414 being subsequently saved as such. Accordingly, when the primary infrared image 400 is retrieved from memory of the camera 200, the camera 200 provides one or more of visible or audio queues to alert the operator that the image 400 has tags, i.e., to saved images 412, 414. In turn, the operator can retrieve the tagged images 412, 414 from the camera memory as desired to be shown on the display 220.

As further described above, regarding either the captured primary thermal image 400 or the related information (images 412, 414), annotations can be added thereto. One such exemplary annotation (e.g., circle marker 416) is illustrated with regard to the image 414, e.g., noting a particularly important parameter of the motor provided on the specifications label 406. While not shown, annotations could have instead or in combination been added with respect to the primary thermal image 400 and/or the image 412. For example, if there was an area of the motor that was damaged, an arrow annotation could have been superimposed on the image 400 in relation to that area.

Figure 5:
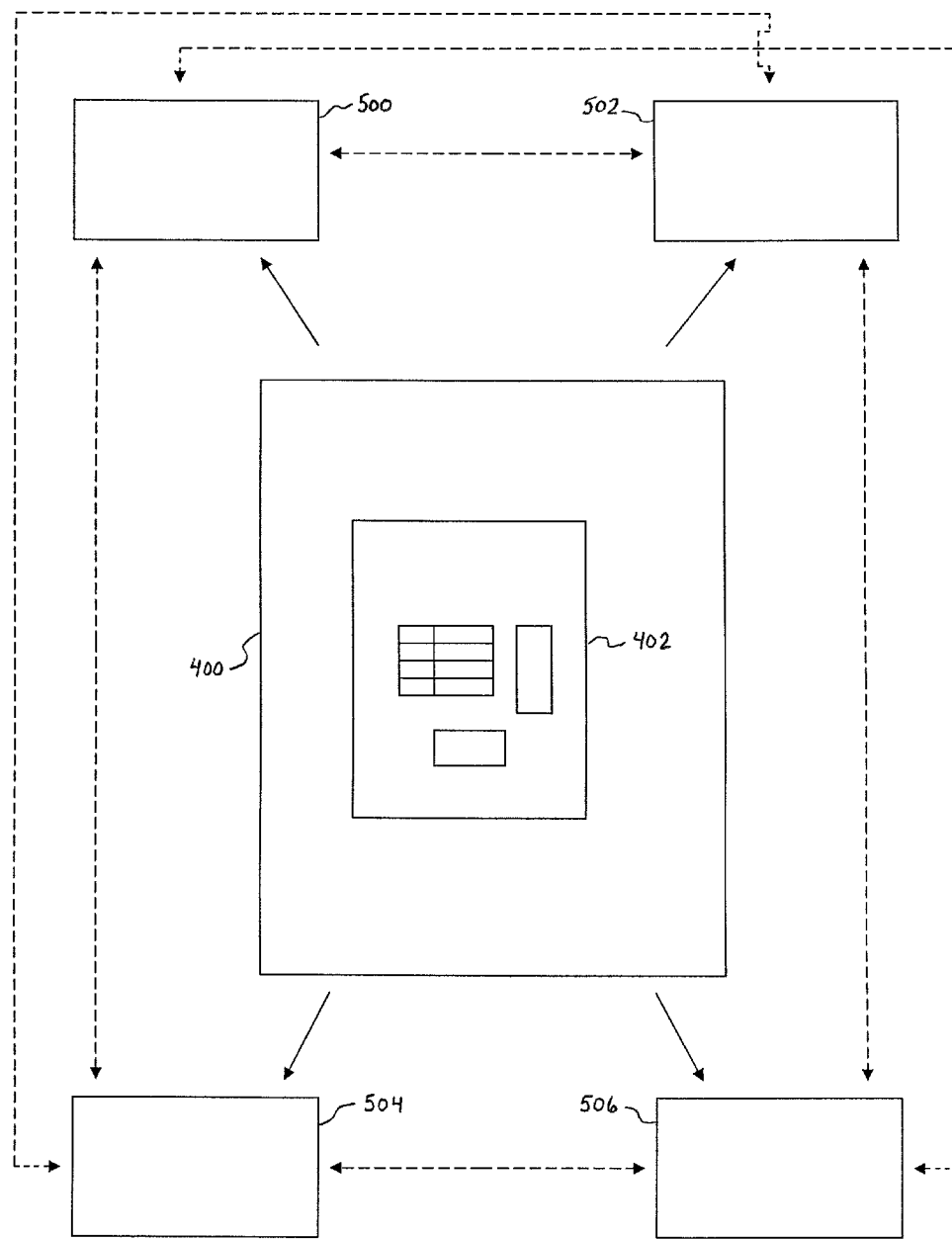
FIG. 5 illustrates a representative captured image set including a primary thermal image and related information linked thereto in accordance with certain embodiments of the invention.

In contrast to FIG. 4, FIG. 5 shows a representative captured image set, including a primary thermal image and related information linked thereto in accordance with certain embodiments of the invention. The primary thermal image 400 of FIG. 4 is again represented in FIG. 5, with the other images (represented as images 500, 502, 504, and 506) represented as having been captured and linked to the image 400. The varying linkages here are represented via the solid and dashed arrows.

To that end, as described above, such linked related information can involve details only ascertained through different views of the object, views of the surroundings of the scene, or views of the surroundings of the location of the scene. Examples of such details may involve other outer surfaces of the object, mounting brackets or secondary pieces of equipment mounted close to or extending from the object, or features of the space or room in which the object is kept. These details can be significant to the functioning of the object or found as contributing factors to the thermal characteristics observed in the primary infrared image. As such, the views of such details are often captured in the form of infrared images and/or video. Accordingly, while images 500, 502, 504, and 506 do not specifically show such detail, it should be appreciated this is what they represent.

As described above, with reference to camera 200 of FIGS. 2 and 3, following capture and subsequent presentation of each of thermal images 500, 502, 504, and 506 on the camera display 220, in certain embodiments, the operator can select a linking mode from a menu further shown on the display 220. Via use of the menu, the operator can associate the images 500, 502, 504, and 506 to be tags of the primary thermal image 400, with the image 400 and linked images 500, 502, 504, and 506 being subsequently saved as such. Accordingly, when the primary infrared image 400 is retrieved from memory of the camera 200, the camera 200 provides one or more of visible or audio queues to alert the operator that the image 400 has link(s), e.g., to saved images 500, 502, 504, and 506. In turn, the operator can retrieve the linked images 500, 502, 504, and 506 from the camera memory as desired to be shown on the display 220.

As further described above, given the multitude of thermal images that may be potentially linked to the primary thermal image, it may be desirable to distinguish such linked information. This concept is depicted in FIG. 5. To that end, in certain embodiments, the thermal images 500, 502, 504, and 506 can be categorically linked to the primary thermal image 400 based on the relatedness of such information to the object. For example, in certain embodiments, thermal images captured of differing views of the object (e.g., involving each of the images 500, 502, 504, and 506) are primarily linked to the primary infrared image 400, with such primary link being represented with a solid arrow.

Alternatively, while not shown, thermal images captured of views of the scene surrounding the object or views of the location surrounding the scene can be secondarily linked to the primary infrared image 400, with such link being represented with a dashed arrow. To that end, FIG. 5 shows that all of the images 500, 502, 504, and 506 have been linked to each other. However, due to their images not being shown in each other, they fall outside the parameters for being primarily linked. Accordingly, each of the images 500, 502, 504, and 506 is shown as being secondarily linked (with dashed arrow) to each other.

Finally, while not shown in FIG. 4 or 5, in certain embodiments, regarding tagged related information (such as images 412, 414 of FIG. 4), any may be further tagged or linked to other images following the same procedures as described herein. Likewise, regarding linked related information (such as images 500, 502, 504, and 506 of FIG. 5), any may be tagged or further linked to other images following the same procedures as described herein. Accordingly, starting from a primary thermal image, a virtual web of related information can be associated with the image. Such associated information collectively represents an asset information card for the image that can be created on the same visit to the field during which the image is captured, and enables ready access and potential updating thereto by an operator upon retrieval of the primary thermal image from the imager.

Thus, embodiments of the invention are disclosed. Although the present invention has been described in considerable detail with reference to certain disclosed embodiments, the disclosed embodiments are presented for purposes of illustration and not limitation and other embodiments of the invention are possible. One skilled in the art will appreciate that various changes, adaptations, and modifications may be made without departing from the spirit of the invention and the scope of the appended claims.

What is claimed is:

1. A method for associating an infrared image of an object of a scene with information relating to one or more of the object and the scene, comprising:

capturing a primary infrared image of the object of the scene with a thermal imager;

capturing related information following the capture of the primary infrared image, the related information involving further detail regarding one or more of the object, surroundings of the scene, and surroundings of location of the scene, the related information comprising one or more of images and video recordings, the related information being captured via one or more of infrared and visible light capabilities of the thermal imager; and associating the captured related information with the primary infrared image in distinct manners based on both of the further detail of the captured related information and correlation between the further detail and the primary infrared image such that the related information is made distinguishable as to relatedness to the primary thermal image during future retrieval of the primary thermal image, and comprising two manners of associating the captured related information with the primary thermal image based on the correlation between the further detail of the related information and the primary thermal image.

2. The method of claim 1 wherein the thermal imager comprises an infrared camera, wherein the primary infrared image is captured via use of a focal plane array housed within the infrared camera.

3. The method of claim 1 wherein each of the captured related information is associated based on whether the further detail therein is shown in the primary infrared image, and wherein the captured related information is associated in a first of the two manners when corresponding detail is shown in yet indiscernible from the primary infrared image.

4. The method of claim 3 wherein the corresponding detail is out of focus, wherein the captured related information associated in the first manner comprises one or more of a visible-light image and video recording.

5. The method of claim 3 wherein the corresponding detail is dependent on a thermal characteristic of a further object in the scene, wherein the captured related information associated in the first manner comprises one or more of an infrared image and video recording.

6. The method of claim 3 wherein the captured related information is associated in a second of the two manners when the further detail is related to the object yet blocked from view in the primary infrared image or situated outside the primary infrared image.

7. The method of claim 6 wherein certain of the captured related information associated with the primary infrared image in the second of the two manners is further linked by category to the primary infrared image based on relatedness to the object of the primary thermal image.

8. The method of claim 7 further comprising two linking categories, wherein the linking categories comprise primary linking and secondary linking, wherein primary linked information comprises different views of the object, and wherein secondary linked information comprises views of the scene surrounding the object and/or of the location surrounding the scene.

9. The method of claim 6 wherein associating the captured related information is performed during a same visit to the scene when capturing the primary infrared image.

10. The method of claim 6 wherein the related information is captured during a second visit to the scene subsequent to a first visit to the scene when the primary infrared image was captured.

11. The method of claim 1 wherein the primary infrared image is captured for industrial maintenance purposes regarding one or more of the object and the related information.

12. A data storage device having computer-executable instructions for performing the method of claim 1.

13. The method of claim 1 wherein the two manners of relation comprise tagging and linking, wherein tagged information comprises certain of the captured related information that is directly related to the primary thermal image, and wherein linked information comprises other of the captured related information indirectly related to the primary thermal image.

14. The method of claim 13 wherein the tagged information comprises details regarding the object.

15. The method of claim 13 wherein the linked information comprises different views of the surroundings of the object, surroundings of the object scene, and/or surroundings of the location of the scene.

16. The method of claim 1 wherein the primary thermal image is selectively associated via one of the two manners of relation via use of a drop-down menu.

17. The method of claim 1 wherein the captured and associated related information is selectively retrievable for viewing following retrieval of the primary thermal image.

18. The method of claim 1 wherein certain of the captured related information is further linked by category to other of the captured related information based on relatedness of information depicted amongst the captured related information.

19. A method for associating an infrared image of an object of a scene with information relating to one or more of the object and the scene, comprising:
  capturing a primary infrared image of the object of the scene with a thermal imager;
  capturing related information following the capture of the primary infrared image, the related information involving further detail regarding one or more of the object, surroundings of the scene, and surroundings of location of the scene, the related information comprising one or more of images and video recordings, the related information being captured via one or more of infrared and visible light capabilities of the thermal imager; and
  associating the captured related information with the primary infrared image based on both of the further detail of the captured related information and correlation between the further detail and the primary infrared image, wherein the captured related information is associated during a same visit to the scene when capturing the primary infrared image, and comprising two manners of associating the captured related information with the primary thermal image based on the correlation between the further detail of the related information and the primary thermal image.

20. The method of claim 19 wherein each of the captured related information is associated based on whether the further detail therein is shown in the primary infrared image, wherein the captured related information is associated in a first of two manners when corresponding detail is shown in the primary thermal image.

21. The method of claim 20 wherein the captured related information is associated in a second of the two manners when the further detail is outside the primary infrared image.

22. The method of claim 19 further comprising associating one or more of audio and text annotations with the captured related information.

23. The method of claim 19 further comprising associating one or more of the captured related information with one or more of the other captured related information.

24. The method of claim 23 wherein each of the one or more captured related information is associated with the corresponding one or more other captured related information based on detail therein being related.

25. The method of claim 19 further comprising the step of retrieving the primary infrared image from memory of the thermal imager, wherein one or more queues are provided by the imager to indicate the captured related information associated with the primary infrared image.

26. The method of claim 19 further comprising capturing further related information during a subsequent visit to the scene; and associating the captured related information with the primary infrared image.

* * * * *